United States Patent
Goodwin, III et al.

(10) Patent No.: US 6,970,851 B1
(45) Date of Patent: Nov. 29, 2005

(54) SYSTEM AND METHOD OF CONFIGURING VALUE CARDS

(75) Inventors: John C. Goodwin, III, Suwanee, GA (US); Michael E. Halpern, Collingswood, NJ (US)

(73) Assignee: NCR Corporation, Dayton, OH (US)

( * ) Notice: Subject to any disclaimer, the term of this patent is extended or adjusted under 35 U.S.C. 154(b) by 649 days.

(21) Appl. No.: 09/966,162

(22) Filed: Sep. 28, 2001

(51) Int. Cl.[7] ............................................. G06F 17/60
(52) U.S. Cl. ........................... 705/66; 705/64; 705/65; 705/67; 705/72; 705/73; 705/75; 713/189; 713/194; 713/200; 713/201; 713/202; 380/200; 380/255; 710/104
(58) Field of Search ............................... 705/64–79, 41; 713/189, 194, 200–202; 380/200, 255; 710/104

(56) References Cited

U.S. PATENT DOCUMENTS

| | | | |
|---|---|---|---|
| 6,192,436 B1 * | 2/2001 | Jacobson et al. | 710/104 |
| 2001/0013551 A1 * | 8/2001 | Ramachandran | 235/472.02 |
| 2001/0018660 A1 * | 8/2001 | Sehr | 705/5 |
| 2002/0055911 A1 * | 5/2002 | Guerreri | 705/64 |
| 2002/0194138 A1 * | 12/2002 | Dominguez et al. | 705/64 |
| 2003/0053609 A1 * | 3/2003 | Risafi et al. | 379/114.2 |

FOREIGN PATENT DOCUMENTS

WO          WO 99/405148     * 8/1999 ............. G07F 7/10

OTHER PUBLICATIONS

Roger Clarke, "Centrelink Smart Card Technical Issues Starter Kit Chapter 2", Apr. 1998.*
Chan, Siu-cheung Charles, "An Overview of Smart Card Security", 1997.*

* cited by examiner

Primary Examiner—James P. Trammell
Assistant Examiner—Jalatee Worjloh
(74) Attorney, Agent, or Firm—Paul W. Martin; Maginot, Moore & Beck LLP

(57) ABSTRACT

A system and method of configuring value cards which facilitates selection of personalized limits on value card use in transactions. The value card configuration system includes a display for displaying value card configuration options, an input device for recording customer selections of the value card configuration options, and a computer for controlling the display and the input device, for assigning a value card identification number to the value card, for dispensing the value card, for establishing a connection to a value card host computer, and for sending the selections to the value card host computer via the connection for later retrieval during a transaction in which the value card is used for payment.

3 Claims, 4 Drawing Sheets

SYSTEM AND METHOD OF CONFIGURING VALUE CARDS

CROSS-REFERENCE TO RELATED APPLICATIONS

The present invention is related to the following commonly assigned and co-pending U.S. application:
"Transaction System and Method for Value Cards", filed Sep. 28, 2001, invented by Goodwin, and having a Ser. No. 09/966,160.

BACKGROUND OF THE INVENTION

The present invention relates to self-service terminals and more specifically to a system and method of configuring value cards.

Kiosks provide a publicly-accessible computing platform for displaying World Wide Web (WWW or "web") pages and other web-delivered content from retailer web sites. Kiosks may be located within a retailer's transaction establishment or elsewhere, such as in shopping malls. Kiosks may be easily networked to retailer web sites using the Transmission Control Protocol/Internet Protocol (TCP/IP). Web pages from web sites may be displayed using known and available web software, such as Microsoft® Internet Explorer software.

Value cards are an alternative payment vehicle to cash or credit cards. Value cards are typically provided by credit card companies. Value cards have monetary limits which decrease as the cards are used to pay for goods and services. The monetary limits of some value cards may be increased by making additional payments to the card provider.

Parents find value cards attractive because they teach their children responsible spending habits. However, value cards may still be used to buy items which parents would otherwise not approve of.

Therefore, it would be desirable to provide a system and method of configuring value cards which allows parental control over the purchases made with value cards. It would also be desirable for such a system to allow parents to control value cards using a kiosk.

SUMMARY OF THE INVENTION

In accordance with the teachings of the present invention, a system and method of configuring value cards is provided.

The value card configuration system includes a display for displaying value card configuration options, an input device for recording customer selections of the value card configuration options, and a computer for controlling the display and the input device, for assigning a value card identification number to the value card, for dispensing the value card, for establishing a connection to a value card host computer, and for sending the selections to the value card host computer via the connection for later retrieval during a transaction in which the value card is used for payment.

Value card configuration options include total monetary value, payment amount limit at each transaction, individual goods and services, individual goods and services providers, categories of goods and services, categories of goods and services providers, and purchase times and dates. Other options which facilitate customer control over use of the value card are also envisioned.

It is accordingly an object of the present invention to provide a system and method of configuring value cards.

It is another object of the present invention to provide a system and method of configuring value cards which allows parents and other benefactors to issue and replenish value card limits.

It is another object of the present invention to provide a system and method of configuring value cards which allows parents and other benefactors to control limits on spending amounts, limits on goods and services, limits on goods and services providers, limits on purchase times and dates, and other types of limits.

It is another object of the present invention to provide a system and method of configuring value cards which allows parents and other benefactors to issue and replenish value cards using a kiosk.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
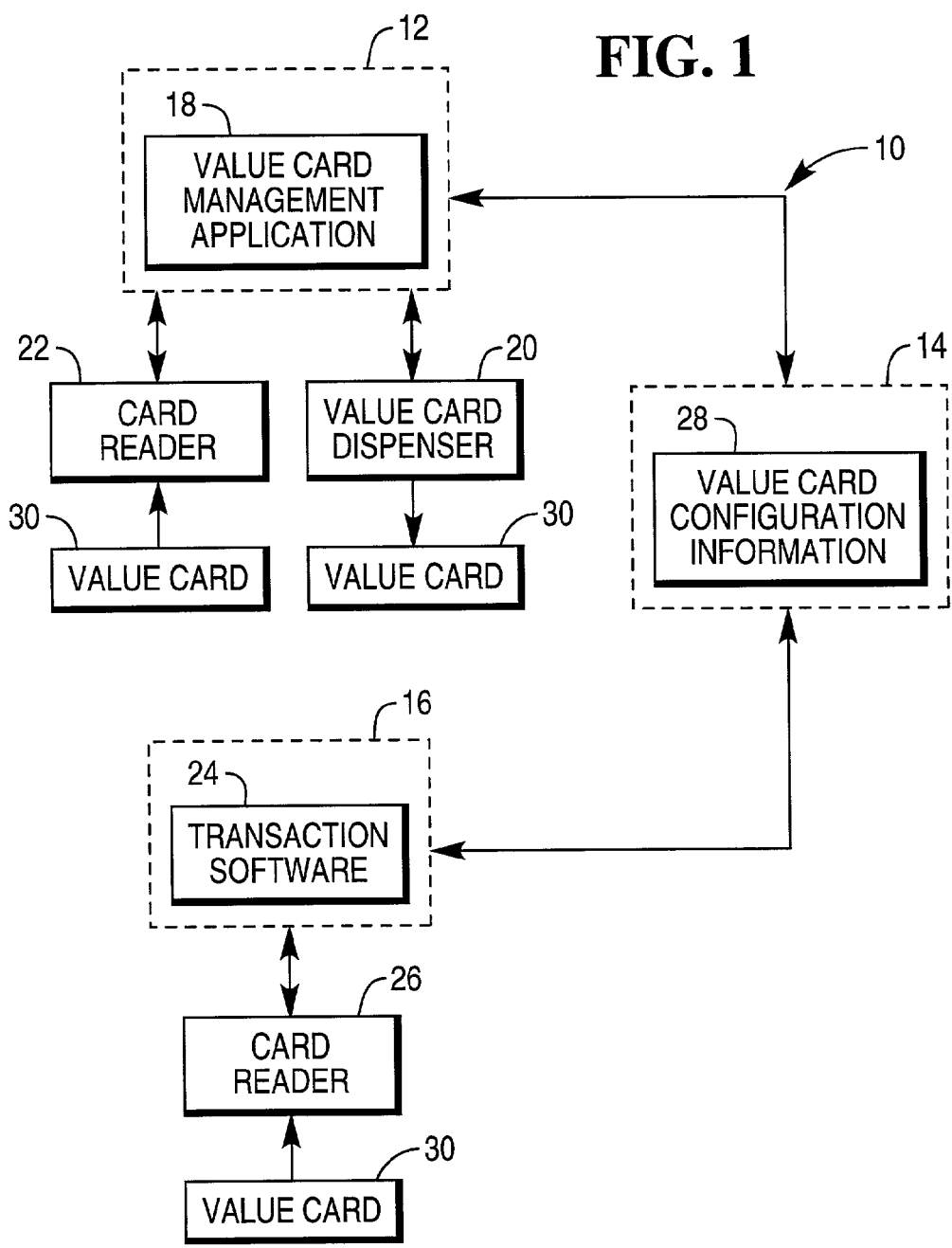
FIG. 1 is a block diagram of a value card system.

Turning now to FIG. 1, system 10 primarily includes value card processing terminal 12, value card host system 14, and transaction terminal 16.

Value card processing terminal 12 executes value card management application 18. Value card management application 18 manages sales and replenishments of value cards 30 in accordance with value card customer instructions. Value card processing terminal 12 dispenses new value cards 30 from value card dispenser 20 and reads old value cards 30 in need of replenishment using card reader 22.

Value card management application 18 assigns a unique identification number to new value cards 30 in order to make them identifiable later if the customer wishes to replenish them. Value card management application 18 also preferably issues a customer password which must be provided by the customer at replenishment. The use of passwords allows parents and other benefactors to control replenishment.

Value card management application 18 records instructions such as limits on total monetary value, limits on spending amounts at each transaction, goods and services eligible for purchase via a value card 30, individual goods and services providers where value card 30 may be used, categories of goods and services, and categories of goods and services providers where value card 30 may be used, purchase times and dates for using value card 30, and combinations thereof. Value card management application 18 stores value card limits as value card configuration information 28, which it sends to value card host provider system 14.

For example, a customer may elect to purchase a value card 30 which can only be used at gasoline stations.

As another example, a customer may elect to purchase a value card 30 which can only be used at a particular name brand grocery store and which can only be used to pay for food items.

As yet another example, a customer may elect to purchase a value card 30 which can only be used to pay for clothing items, which can only be used to pay for transaction amounts of fifty dollars or less, and which can only be used once a month.

Value card processing terminal 12 may include a kiosk or other publicly accessible computer. As a publicly accessible computer, value card processing terminal 12 may be located at a value card provider's establishment or other public place. Public access provides payment options such as cash, credit card, debit card, smart card, electronic check (e-check), and conventional paper check. Value card processing terminal 12 may alternatively include a home or other personal computer. Home access may mean a delay between customer payment and delivery of a new value card. Payment options may be limited and include credit or debit card, e-check, or conventional paper check. Card and e-check payments may be recorded on-line, but conventional paper checks may have to be mailed to value card provider.

Value card management application 18 communicates with value card host system 14. A suitable connection includes a network connection, such as one which uses the Transmission Control Protocol/Internet Protocol (TCP/IP). Value card processing terminal 12 may be connected to the World Wide Web (WWW or "web") and value card host system 14 may be a web server. Value card management application 18 may be a web application. The network connection may be wireless or may be via phone line or other type of cable connector.

Value card host system 14 is associated with a value card provider, such as Visa, MasterCard, or American Express. Value card host system 14 receives value card configuration information 28 from value card processing terminal 12. If payment is made over the connection between value card processing terminal 12 and value card host system 14, value card host system 14 also receives payment information from value card processing terminal 12 and reports successful receipt of payment information to value card management application 18.

Transaction terminal 16 is located at a transaction establishment, such as a grocery store or other retail goods or services provider. Transaction terminal 16 reads value cards 30 using card reader 26. Transaction terminal 16 communicates with value card host system 14 over a suitable connection, such as a network connection.

Transaction terminal 16 executes transaction software 24 which tallies purchased items and collects payment. When value card 30 is used to pay for goods or services, transaction software 24 obtains value card identification information and contacts value provider host system 14 to obtain value card configuration information 28 associated with value card 30. Transaction software 24 compares the terms of the transaction with the limits in value card configuration information 28 to determine whether any of the limits have not been met. If any limitations have not been met, transaction software 24 alerts the operator and rejects all or part of the transaction which was to be paid for using value card 30. For those goods or services that meet the limitations in value card configuration information 28, transaction software 24 accepts payment.

Figure 2:
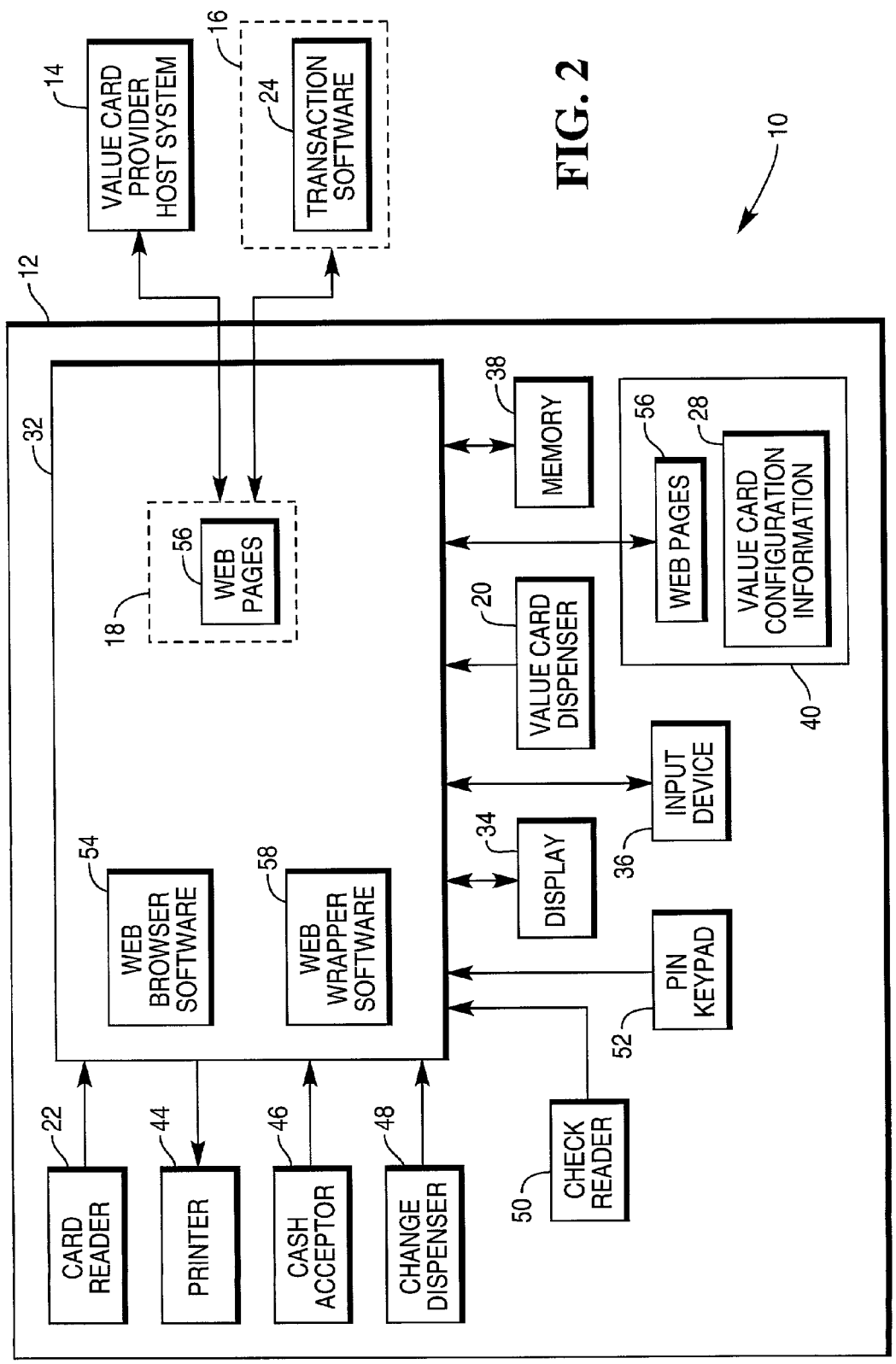
FIG. 2 is a block diagram of a value card processing terminal.

Turning now to FIG. 2, an example value card processing terminal 12 is shown in detail. In this example, value card processing terminal 12 is a publicly accessible terminal, such as a kiosk, which communicates with value card provider host system 14 over the World Wide Web. Value card processing terminal 12 may include an NCR 7401 computer.

Value card processing terminal 12 additionally includes processor 32, display 34, input device 36, memory 38, storage medium 40, card reader 42, printer 44, cash acceptor 46, change dispenser 48, check reader 50, personal identification number (PIN) keypad 52. Input device 36 and display 34 may be combined as a touch screen.

Processor 32 executes value card management 18 and web browser software 54. Web browser software 54 allows a customer to view information in a format established by the World Wide Web. Value card management application 18 may be written as a web application which displays value card configuration information in the form of web pages 56, although value card management application 18 may also be a non-web application and operate without web browser software 54. Web pages 56 may be written using hypertext markup language (HTML) or other suitable web page language. Web browser software 54 may include commercially available web browser software, such as Microsoft® Internet Explorer web browser software.

If value card processing terminal 12 is configured as a kiosk, processor 32 also preferably executes web wrapper software 58. Web wrapper software 58 provides security functions. During operation, web wrapper software 58 prevents an operator from accessing kiosk files, or other applications, or the operating system software, or basic input-output system (BIOS) firmware, and prevents the operator from causing value card processing terminal 12 to reboot. Microsoft® Internet Explorer web browser software uses a "–k" command line option during kiosk operation to hide toolbars and menu bars to prevent operator access to those functions. Web browser software 54 may also display a start or "home" page within web pages 56 which operates as a default page from which kiosk operation begins and to which operation returns when an operator is finished using value card processing terminal 12.

Input device 36 records customer selections during a value card transaction.

Display 34 displays information provided by value card management application 18.

Storage medium 40 stores value card configuration information 28 and may store some web pages 56.

Memory 38 is used by processor 32 to store executed program information.

Card reader 42 reads credit, debit, smart, value and/or other types of cards carried by a value card customer.

Printer 44 prints receipt information.

Cash acceptor 46 accepts cash in multiple denominations.

Change dispenser 48 dispenses change.

Check reader 50 reads checks and includes a magnetic ink character (MICR) reader.

PIN keypad 52 records PIN numbers for debit card transactions.

Figure 3A:
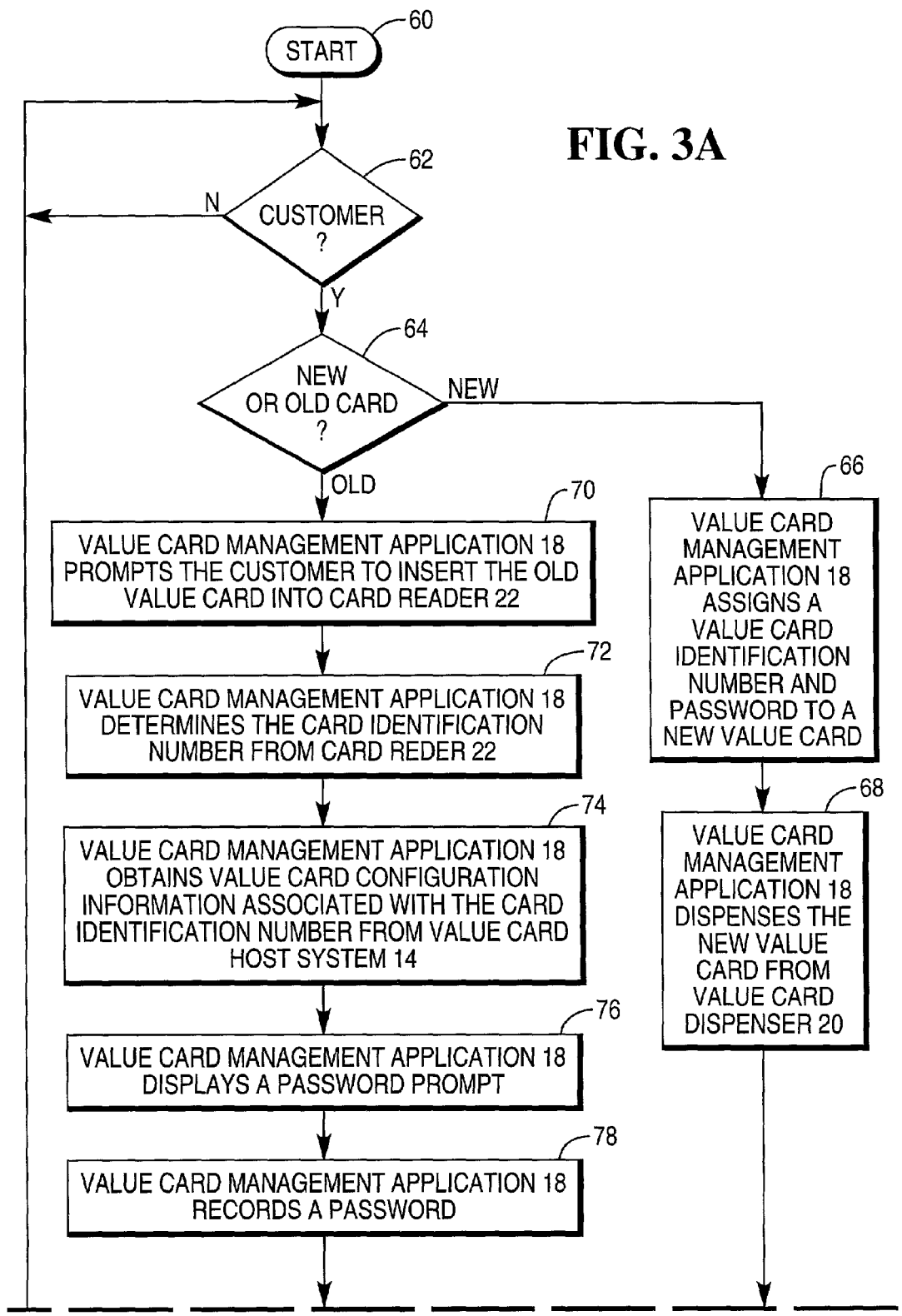
FIG. 3 is a flow diagram illustrating a method of configuring a value card.
Figure 3B:
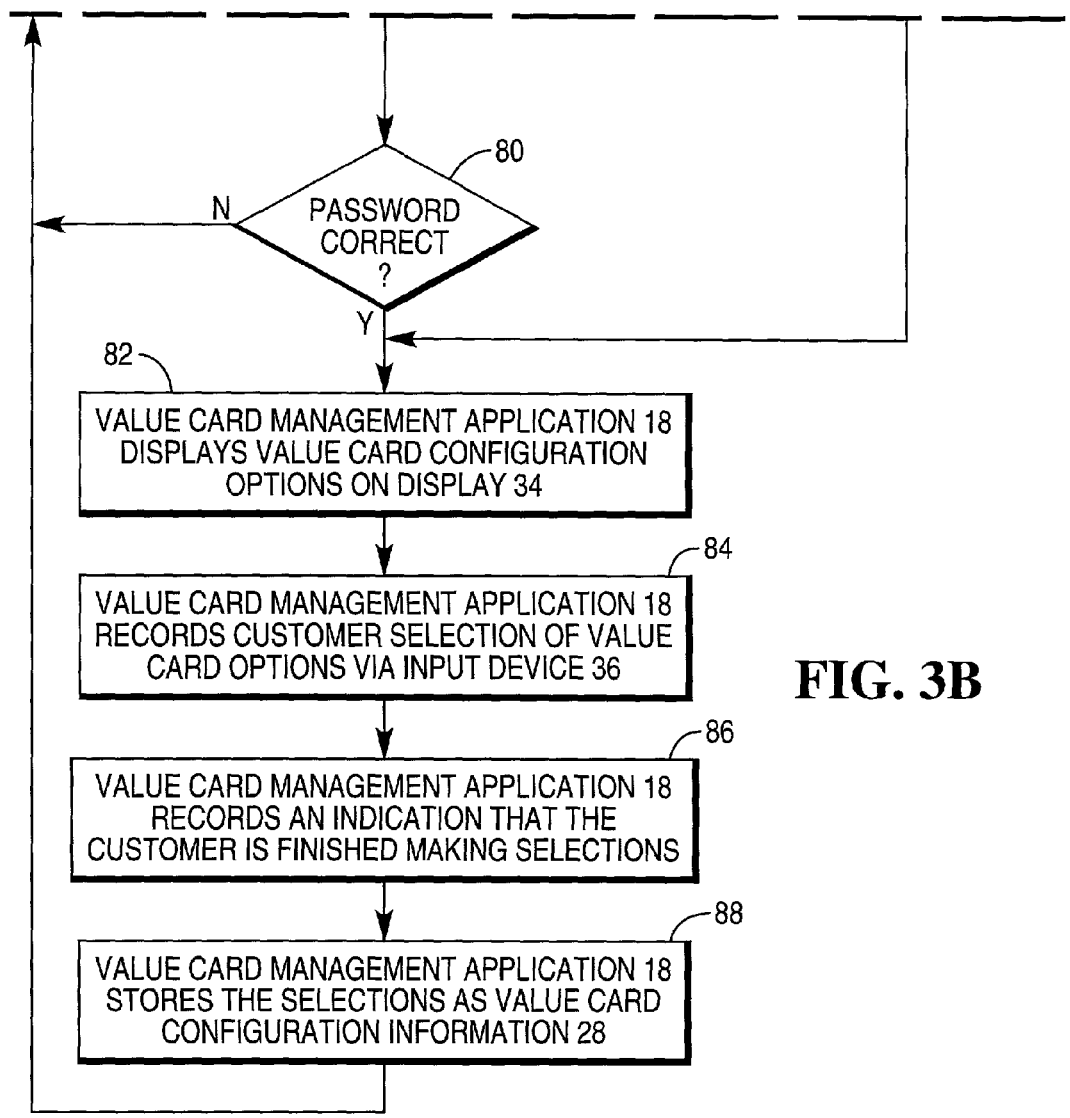

Turning now to FIG. 3, the method of configuring a value card is illustrated beginning with START 60.

In step 62, value card management application 18 waits for a customer.

In step 64, value card management application 18 determines whether the customer has selected either a new card or to replenish an old card. If the customer has selected a new card, operation proceeds to step 66. Otherwise, operation proceeds to step 70.

In step 66, value card management application 18 assigns a value card identification number to a new value card. Value card management application 18 may also assign or record a password to prevent card recipient modification of limits and to control card replenishment.

In step 68, value card management application 18 dispenses the new value card from value card dispenser 20. Operation proceeds to step 76.

In step 70, value card management application 18 prompts the customer to insert the old value card into card reader 42.

In step 72, value card management application 18 determines the card identification number from card reader 22.

In step 74, value card management application 18 obtains value card configuration information, including a password, associated with the card identification number from value card host system 14.

In step 76, value card management application 18 displays a password prompt and waits for password entry.

In step 78, value card management application 18 records a password.

In step 80, value card management application 18 determines whether the password is correct. If so, operation proceeds to step 82. Otherwise, operation returns to step 62. A loop allowing several password entry attempts is also envisioned.

In step 82, value card management application 18 displays value card configuration options on display 34. Value card management application 18 displays current selections for value card configuration options for the old value card.

In step 84, value card management application 18 records customer selection of value card options via input device 36.

In step 86, value card management application 18 records an indication that the customer is finished making selections.

In step 88, value card management application 18 stores the selections as value card configuration information 28.

Operation returns to step 62 to await for another customer.

Advantageously, value card management application 18 facilitates selection of personalized limits on value card use in transactions.

Although the present invention has been described with particular reference to certain preferred embodiments thereof, variations and modifications of the present invention can be effected within the spirit and scope of the following claims.

What is claimed is:

1. A value card configuration system comprising:
    a host computer programmed to
    (i) receive a first plurality of value card configuration settings selected by a user from value card configuration options associated with a first transaction,
    (ii) receive a password associated with the first transaction,
    (iii) associate the first plurality of value card configuration settings with the password associated with the first transaction,
    (iv) store the received first plurality of value card configuration settings,
    (v) store the received password associated with the first transaction,
    (vi) receive a second plurality of value card configuration settings selected by a user from value card configuration options during a second transaction,
    (vii) receive a password associated with the second transaction,
    (viii) receive a data signal based upon machine reading during the second transaction of a value card machine readable code,
    (ix) associate the password associated with the second transaction with the password associated with the first transaction based upon the received data signal,
    (x) compare the password associated with the second transaction with the password associated with the first transaction, and
    (viii) update the stored first plurality of value card configuration settings with the received second plurality of value card configuration settings if the password associated with the second transaction matches the password associated with the first transaction.

2. The value card configuration system of claim 1, wherein the host computer is further programmed to:
    associate a value card identification number with the first plurality of value card configuration settings;
    receive transaction terms and a value card identification number associated with the transaction terms;
    match the value card identification number associated with the transaction terms with the value card identification number associated with the first plurality of value card configuration settings;
    compare the transaction terms to the stored first plurality of value card configuration settings; and
    accept the transaction if the transaction terms meet the stored first plurality of value card configuration settings.

3. The value card configuration system of claim 2, wherein the host computer is operable to receive the value card identification number associated with the transaction terms from a value card reader at a vendor location.

* * * * *